(12) United States Patent
Kim et al.

(10) Patent No.: US 8,353,043 B2
(45) Date of Patent: Jan. 8, 2013

(54) WEB FIREWALL AND METHOD FOR AUTOMATICALLY CHECKING WEB SERVER FOR VULNERABILITIES

(75) Inventors: Min Sik Kim, Daejeon (KR); Jung Gil Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1293 days.

(21) Appl. No.: 12/057,457

(22) Filed: Mar. 28, 2008

(65) Prior Publication Data

US 2009/0100522 A1    Apr. 16, 2009

(30) Foreign Application Priority Data

Oct. 16, 2007 (KR) .................. 10-2007-0104113

(51) Int. Cl.
*G06F 11/00* (2006.01)
(52) U.S. Cl. .............. 726/25; 726/22; 726/23; 726/24
(58) Field of Classification Search .............. 726/22–25; 713/189–194
See application file for complete search history.

(56) References Cited

U.S. PATENT DOCUMENTS

| | | | | |
|---|---|---|---|---|
| 6,721,721 | B1* | 4/2004 | Bates et al. ........................... | 1/1 |
| 7,779,469 | B2* | 8/2010 | Hopen et al. .................... | 726/22 |
| 7,926,113 | B1* | 4/2011 | Gula et al. ....................... | 726/25 |
| 2003/0056116 | A1* | 3/2003 | Bunker et al. ................. | 713/201 |
| 2005/0193430 | A1* | 9/2005 | Cohen et al. .................... | 726/25 |
| 2006/0085852 | A1* | 4/2006 | Sima ................................ | 726/22 |
| 2007/0061877 | A1* | 3/2007 | Sima et al. ...................... | 726/12 |
| 2007/0283441 | A1* | 12/2007 | Cole et al. ....................... | 726/25 |
| 2008/0092237 | A1* | 4/2008 | Yoon et al. ...................... | 726/25 |
| 2009/0271863 | A1* | 10/2009 | Govindavajhala et al. ...... | 726/23 |

FOREIGN PATENT DOCUMENTS

| KR | 1020050075950 A | 7/2005 |
|---|---|---|
| KR | 100655492 | 12/2006 |

OTHER PUBLICATIONS

Su Yong Kim, et al; "Design of Vulnerability Scanner Using Email", WISC 2004, pp. 504-511 (2004).

* cited by examiner

*Primary Examiner* — Edward Zee
*Assistant Examiner* — Suman Debnath
(74) *Attorney, Agent, or Firm* — Ladas & Parry LLP

(57) ABSTRACT

Provided is a web firewall for automatically checking for vulnerabilities, including: an administrating server scheduling part for ordering the examination of an administrating web server according to a predetermined examination schedule; a vulnerability search database calling part for calling a vulnerability search database previously stored according to the order of the administrating server scheduling part; a vulnerability searching part for searching for potential vulnerabilities of the administrating web server corresponding to data included in the called vulnerability search database; a vulnerability information deducing part for optimizing the results searched in the vulnerability searching part to deduce vulnerability information; a vulnerability checking part for checking the vulnerabilities of the administrating web server based on the results deduced from the vulnerability information deducing part; and a detailed vulnerability information reporting part for reporting detailed information on the checked vulnerabilities.

13 Claims, 3 Drawing Sheets

WEB FIREWALL AND METHOD FOR AUTOMATICALLY CHECKING WEB SERVER FOR VULNERABILITIES

CROSS-REFERENCE TO RELATED APPLICATION

This application claims priority to and the benefit of Korean Patent Application No. 2007-0104113, filed Oct. 16, 2007, the disclosure of which is incorporated herein by reference in its entirety.

BACKGROUND

1. Field of the Invention

The present invention relates to a web firewall and method for automatically checking a web server for vulnerabilities, and more particularly, to a web firewall and method for automatically checking a web server for vulnerabilities according to a predetermined time schedule.

2. Discussion of Related Art

With the development of Internet technology, vulnerabilities of application programs have become a serious problem, and despite efforts made to prevent such vulnerabilities through inspection, violation of web servers is increasing.

Particularly, since many web servers are still very vulnerable to violation due to inappropriate management, they have to be checked regularly and any weaknesses found must be eliminated to prevent future violation. However, web servers with large-scale domains or frequently changing web contents are very difficult to manage.

Therefore, to solve these problems, a method of checking for vulnerabilities and providing the latest detailed information quickly and easily is required.

SUMMARY OF THE INVENTION

The present invention is directed to a web firewall and method for automatically checking a web server for vulnerabilities.

The present invention is also directed to a web firewall and method for automatically checking a web server for vulnerabilities by setting an automatic schedule on a web firewall, automatically checking administrating web servers for vulnerabilities in consideration of their availability, and automatically reporting the results to an administrator.

One aspect of the present invention provides a web firewall for automatically checking for vulnerabilities, including: an administrating server scheduling part for ordering the examination of an administrating web server according to a predetermined examination schedule; a vulnerability search database calling part for calling a vulnerability search database previously stored according to the order of the administrating server scheduling part; a vulnerability searching part for searching for potential vulnerabilities of the administrating web server corresponding to data included in the called vulnerability search database; a vulnerability information deducing part for optimizing the results searched in the vulnerability searching part to deduce vulnerability information; a vulnerability checking part for checking the vulnerabilities of the administrating web server based on the results deduced from the vulnerability information deducing part; and a detailed vulnerability information reporting part for reporting detailed information on the checked vulnerabilities.

In an exemplary embodiment, the administrating server scheduling part may receive a vulnerability examination scheduling order from an external administrating server. A vulnerability search database may be further included to store vulnerability data of the administrating web server. The vulnerability search database may be regularly updated by an external administrator or via the Internet.

Also, the vulnerability searching part may search for potential vulnerabilities of the administrating web server using at least one external search engine. The vulnerability information deducing part may collect information deduced from the at least one search engine and optimize the results. The detailed vulnerability information reporting part may be transmitted to an external administrating server.

The vulnerability checking part may search for potential vulnerabilities which can allow abnormal access to the administrating web server, interrupt normal service of the administrating web server, or leak, modulate or delete data of the administrating web server. The data included in the vulnerability search database may include a list of vulnerabilities that can be searched by an external search engine.

Another aspect of the present invention provides a method of automatically checking for vulnerabilities using a web firewall, including the steps of: setting a time schedule for checking administrating web server vulnerabilities corresponding to a predetermined examination schedule; confirming a time corresponding to the set schedule and measuring available system resources when the set time has arrived; calling a vulnerability search database when the system resources exceed a predetermined standard value; searching for potential vulnerabilities of the administrating web server corresponding to data extracted from the called vulnerability search database; optimizing the results of the potential vulnerability search; checking the vulnerabilities of the administrating web server corresponding to the optimized results; and making a detailed report on the results of the vulnerability check of the administrating web server.

In an exemplary embodiment, the vulnerability examination schedule may be determined corresponding to a vulnerability examination schedule received from an external administrating server. The potential vulnerabilities of the administrating web server may be searched using at least one search engine.

Further, the step of searching for potential vulnerabilities of the administrating web server may be performed by searching for potential vulnerabilities that can allow abnormal access to the administrating web server, interrupt normal service of the administrating web server, or leak, modulate or delete data of the administrating web server.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The foregoing and other objects, features and advantages of the invention will be apparent from the following more particular description of exemplary embodiments of the invention, as illustrated in the accompanying drawings.

Figure 1:
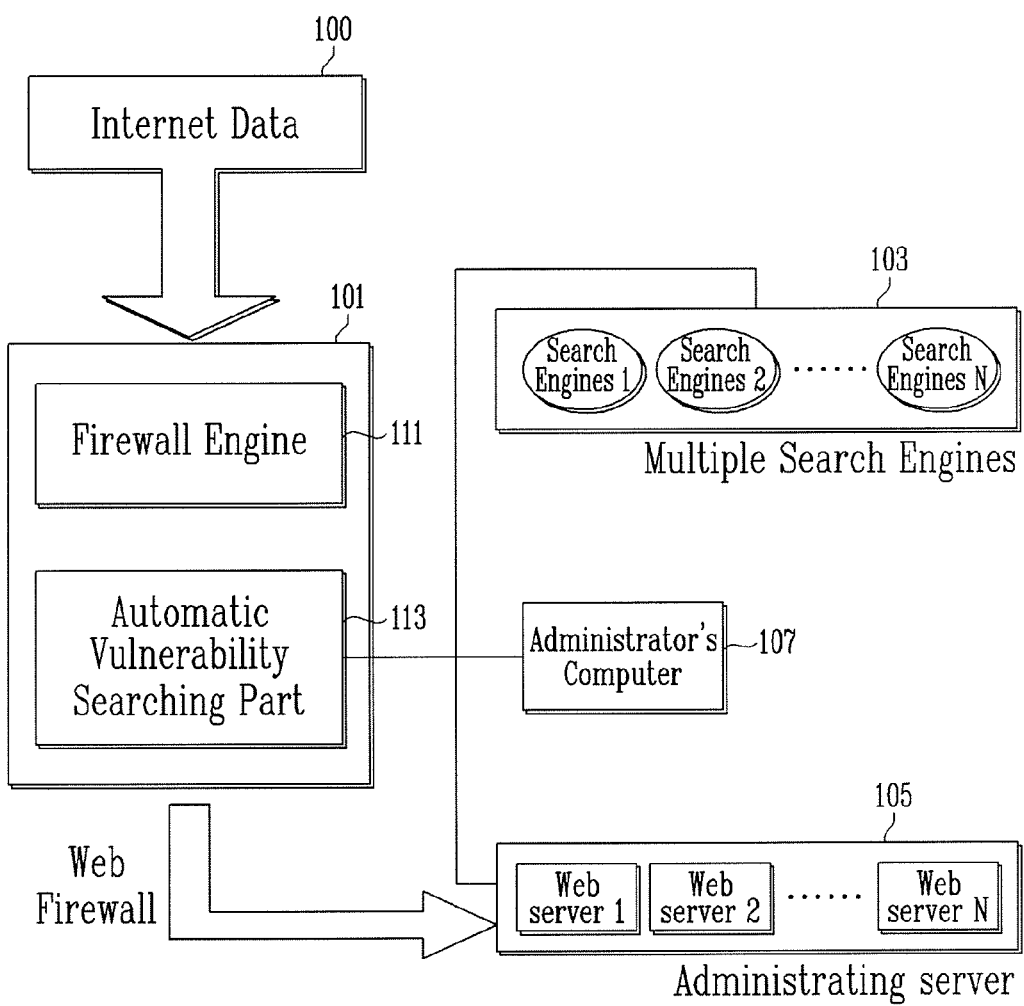
FIG. 1 is an overall diagram illustrating a configuration of a web firewall for automatically checking for vulnerabilities and an environment to which the firewall is applied according to an exemplary embodiment of the present invention.

FIG. 1 is an overall diagram illustrating a configuration of a web firewall for automatically checking for vulnerabilities and an environment to which the firewall is applied.

Referring to FIG. 1, a web firewall 101 for automatically checking for vulnerabilities includes a firewall engine 111 and an automatic vulnerability searching part 113. The web firewall 101 according to the present invention serves to prevent various kinds of violation on an administrating web server 105 by monitoring abnormal data, harmful codes and spy-ware included in Internet data 100 input from an external Internet environment when the Internet data is transmitted to the administrating web servers 105 that the web firewall manages.

A conventional web firewall includes a web firewall engine to prevent violation on a web server, but security vulnerabilities of the web server have to be manually checked regularly through an administrator's computer.

However, in the present invention, since the firewall 101 has the automatic vulnerability searching part 113, the administrator does not need to regularly check for vulnerabilities of the web server 105 manually. When the administrator orders a vulnerability search schedule through the administrator's computer 107, the automatic vulnerability searching part 113 automatically searches for vulnerabilities of the web server 105 regularly managed according to the vulnerability searching schedule, and reports the results. Particularly, the automatic vulnerability searching part 113 reduces resources used by the firewall and executes an exact search by using several external search engines 103 when searching for vulnerabilities.

Figure 2:
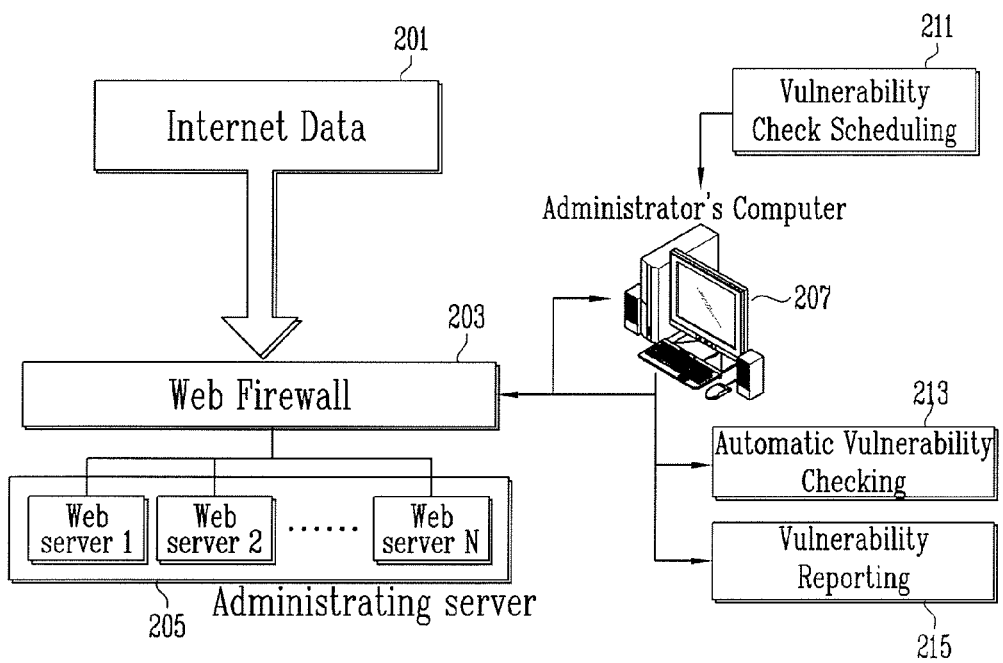
FIG. 2 is a schematic diagram illustrating an operation method of a web firewall for automatically checking for vulnerabilities according to an exemplary embodiment of the present invention.

FIG. 2 is a schematic diagram illustrating an operation method of a web firewall for automatically checking for vulnerabilities.

Referring to FIG. 2, in order to check for security vulnerabilities of a web server 205 managed by a web firewall 203 according to the present invention, which monitors data 201 transmitted to the web server 205 from the Internet, an administrating server 205 transmits a schedule 211 for checking for vulnerabilities of the web server 205 to the web firewall.

Then, the web firewall 203 automatically checks for vulnerabilities using a vulnerability search database included in the web firewall 203 at predetermined times according to the schedule 211 transmitted to the administrating server (213).

Subsequently, a detailed report on the results checked in the web firewall 203 is made and reported to the administrating server (215).

In this case, the web firewall administrator can regularly check for vulnerabilities of the administrating web server without extra effort, thereby reducing effort and cost.

Figure 3:
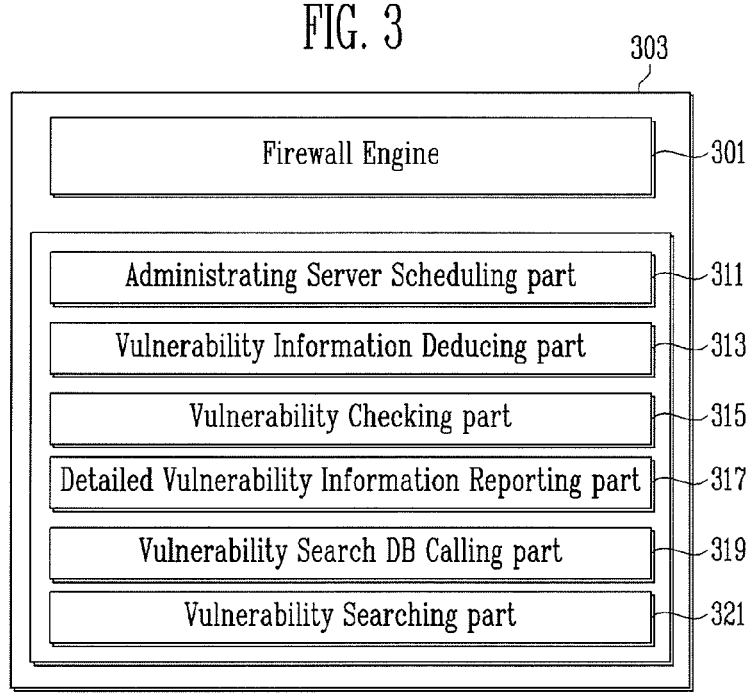
FIG. 3 is a diagram illustrating a detailed configuration of a web firewall for automatically checking for vulnerabilities according to an exemplary embodiment of the present invention.

FIG. 3 is a diagram illustrating a detailed configuration of a web firewall for automatically checking for vulnerabilities according to an exemplary embodiment of the present invention.

Referring to FIG. 3, the web firewall for automatically checking for vulnerabilities according to the present invention includes a firewall engine 301, an automatic vulnerability searching part 303 which may include an administrating server scheduling part 311, a vulnerability information deducing part 313, a vulnerability checking part 315, a detailed vulnerability information reporting part 317, a vulnerability search database calling part 319 and a vulnerability searching part 321.

The firewall engine 301 prevents various kinds of violation of a web server managed by the firewall by monitoring abnormal data, harmful codes and spy-ware included in the Internet data 100 when it is transmitted to several administrating web servers 105 that the web firewall manages. This is not different from a conventional firewall.

The automatic vulnerability searching part 303 is the most critical part of the present invention. It searches for vulnerabilities of the web server automatically managed in response to a vulnerability search scheduling order transmitted from an external administrating server, and reports the search results.

The administrating server scheduling part 311 in the automatic vulnerability searching part 303 receives and analyzes the vulnerability search scheduling order received from the external administrating server, thereby ordering the start of automatic checking for vulnerabilities of the web server regularly managed according to the scheduling order or in response to a scheduling order event.

The vulnerability search database calling part 319 serves to call a database for searching vulnerabilities of the administrating server included in the firewall to examine the vulnerabilities by receiving the order from the administrating server scheduling part 311. Here, data included in a vulnerability database is a list of vulnerabilities that can be searched by an external search engine among common web server vulnerabilities. The data may include vulnerability items included in web applications, administrator's input windows, administrator addresses and contents of the administrating web server, or a list of web pages which should not be open to the public.

The vulnerability searching part 321 searches for potential vulnerabilities in the administrating web server based on information related to the vulnerabilities called by the vulnerability search database calling part 319. It may search for potential vulnerabilities which can allow abnormal approach to the administrating web server, interrupt normal service of the administrating web server, or leak, modulate or delete data of the administrating web server. Such searches may be performed inside the web firewall of the present invention or using several external search servers. When using external search servers, the search can be performed without occupying excessive web server resources.

The vulnerability information deducing part 313 collects information on potential vulnerabilities checked in the vulnerability searching part 321 and optimizes the information to yield the greatest vulnerabilities through logical operations. That is, based on the results deduced from several external search engines, actual vulnerabilities can be deduced.

The vulnerability checking part 315 checks for vulnerabilities of the administrating web server based on the vulnerability information deduced from the vulnerability information deducing part 313. From the administrating web server, these checks are performed by extracting serious vulnerabilities such as system, network and application security vulnerabilities.

The detailed vulnerability information reporting part 317 serves to write detailed results on the items actually checked in the vulnerability checking part 315 and then transmit the detailed results to the administrating server.

Such a module is applied to the web firewall in the exemplary embodiment, but can be added to a network device such as a router or gateway.

Figure 4:
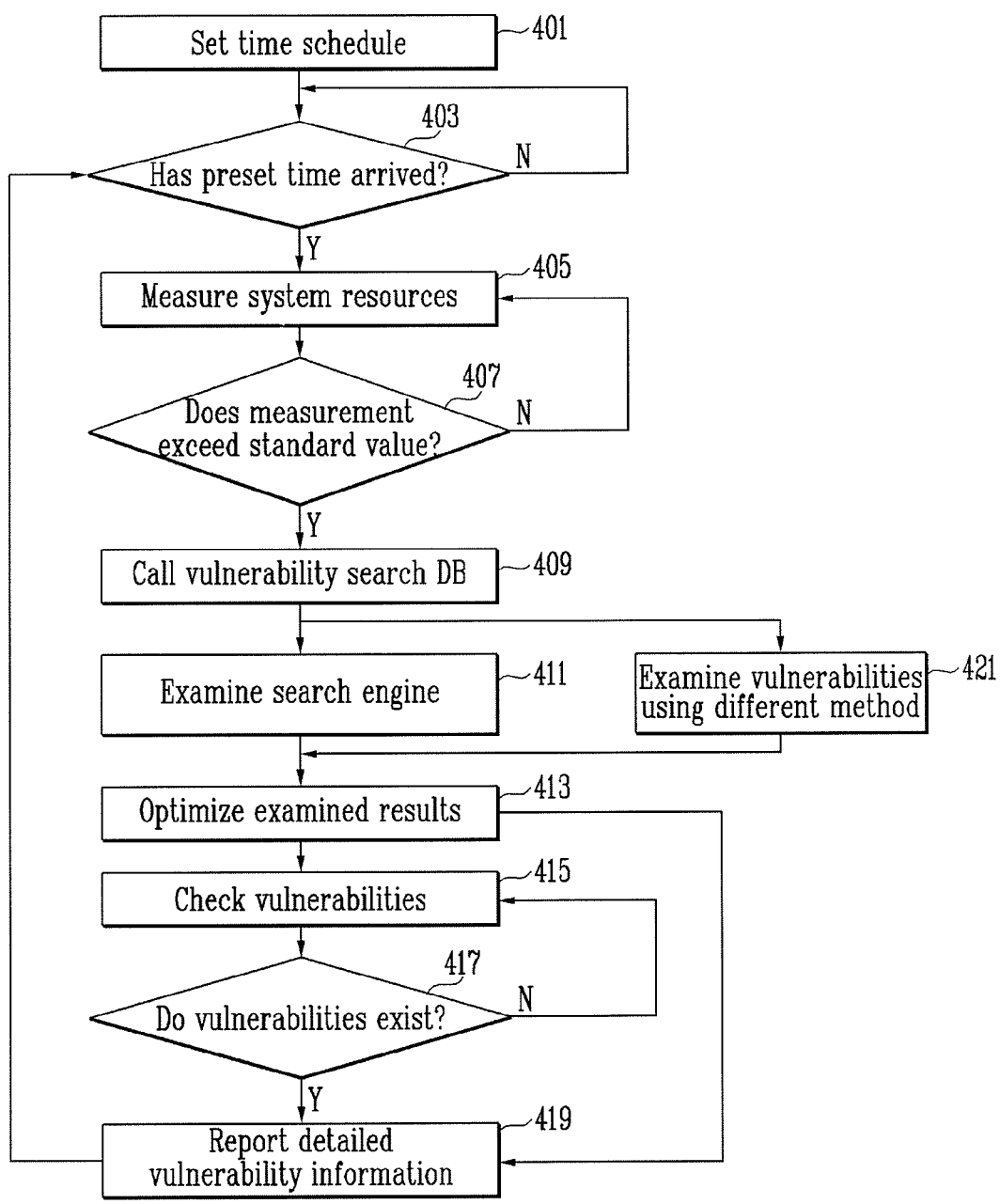
FIG. 4 is a diagram illustrating a method of checking for vulnerabilities using a web firewall for automatically checking for vulnerabilities according to an exemplary embodiment of the present invention.

FIG. 4 is a diagram illustrating a method of checking for vulnerabilities using a web firewall for automatically checking for vulnerabilities according to an exemplary embodiment of the present invention.

Referring to FIG. 4, according to a time scheduling order predetermined by an external administrating server, a schedule is set in an administrating server scheduling part (S401). Then, the administrating server scheduling part verifies if a predetermined time corresponding to the predetermined time schedule has arrived (S403), and if the time has arrived, measures system resources (S405).

This measurement of system resources is performed to enable examination of vulnerabilities when system resources of the web firewall are largely available, since the firewall of the present invention occupies system resources when examining web server vulnerabilities.

When the measured system resources exceed a standard value (S407), a vulnerability search database is called to search for vulnerabilities (S409). The vulnerability search database is a database included in the firewall according to the present invention, and includes information for searching for vulnerabilities of the web server.

When information is acquired from the vulnerability search database, potential vulnerabilities of the administrating web server are examined by the vulnerability searching part. In this embodiment, the potential vulnerabilities are examined using several external search engines (S411), but they can be examined using a different method.

Further, vulnerabilities not easily detected by the external search engines may be searched for using a different method, for example, by using a conventional vulnerability searching program. Such a method involves searching for vulnerabilities not easily detected by the external search servers by examining whether or not a network port prohibited to the administrating web server is open (S421).

After that, any vulnerabilities of the web server are collected and calculated to optimize the searched results (S413). In the results, the most potential vulnerabilities are determined, and the optimized vulnerabilities in the administrating web server are deduced.

Then, the vulnerabilities of the administrating web server are actually checked (S415). If the vulnerabilities exist (S417), a detailed report on the vulnerabilities is written and transmitted to the administrating server (S419).

As the vulnerabilities of the administrating web server in such a method are automatically checked according to the time schedule, a web firewall administrator may avoid the time, effort and cost of checking administrating web servers one by one according to updates on security vulnerability, which are complicated and varied.

The present invention can provide a web firewall and method for automatically checking for vulnerabilities.

The present invention can also provide a web firewall and method for automatically checking for vulnerabilities by setting an automatic schedule, automatically checking for vulnerabilities in administrating web servers in consideration of resource availability, and reporting the results to an administrator.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An administrating web server including a web firewall for automatically checking for vulnerabilities, comprising:
a processor;
an administrating server scheduling part for ordering the examination of the administrating web server according to a predetermined examination schedule;
a vulnerability search database calling part for calling a vulnerability search database previously stored according to the order of the administrating server scheduling part,
wherein the called vulnerability search database comprises a list of vulnerabilities included in the web firewall from internet data transmitted thought the web firewall to the web servers, and
wherein the list of vulnerabilities are generated prior to the ordered examination of the administrating web server according to the predetermined examination schedule;
a vulnerability searching part for searching for potential vulnerabilities of the administrating web server corresponding to data included in the called vulnerability search database, wherein the vulnerability searching part searches for potential vulnerabilities of the administrating web server using at least one external search engine, and
wherein the at least one external search engine searches for the potential vulnerabilities from the list of vulnerabilities included in the web firewall;
a vulnerability information deducing part for optimizing the results searched in the vulnerability searching part to deduce vulnerability information;
a vulnerability checking part for checking the vulnerabilities of the administrating web server based on the results deduced from the vulnerability information deducing part; and
a detailed vulnerability information reporting part for reporting detailed information on the checked vulnerabilities.

2. The administrating web server according to claim 1, wherein the administrating server scheduling part receives a vulnerability examination scheduling order from an external administrating server.

3. The administrating web server according to claim 1, further comprising:
a vulnerability search database for storing data on vulnerabilities of the administrating web server.

4. The administrating web server according to claim 3, wherein the vulnerability search database is regularly updated by an external administrator or via the Internet.

5. The administrating web server according to claim 1, wherein the vulnerability information deducing part collects information deduced from the at least one search engine and optimizes the results.

6. The administrating web server according to claim 1, wherein the detailed vulnerability information reporting part is transmitted to an external administrating server.

7. The administrating web server according to claim 1, wherein the vulnerability checking part searches for potential vulnerabilities which can allow abnormal access to the administrating web server, interrupt normal service of the administrating web server, or leak, modulate or delete data of the administrating web server.

8. The administrating web server according to claim 1, wherein the data included in the vulnerability search database comprises a list of vulnerabilities that can be searched by an external search engine.

9. A method of automatically checking for vulnerabilities using a web firewall for automatically checking for vulnerabilities, comprising the steps of:
- setting a time schedule for checking administrating web server vulnerabilities corresponding to a predetermined examination schedule;
- confirming a time corresponding to the set schedule and measuring available system resources when the set time has arrived;
- calling a vulnerability search database when the system resources exceed a predetermined standard value, and wherein the called vulnerability search database comprises a list of vulnerabilities include in the web firewall from internet data transmitted thought the web firewall;
- searching for potential vulnerabilities of the administrating web server corresponding to data extracted from the called vulnerability search database, wherein the potential vulnerabilities of the administrating web server are searched using at least one external search engine, and wherein the at least one external search engine searches for the potential vulnerabilities from the list of vulnerabilities included in the web firewall;
- optimizing the results of the potential vulnerability search;
- checking the vulnerabilities of the administrating web server corresponding to the optimized results; and
- making a detailed report on the results of the vulnerability check of the administrating web server.

10. The method according to claim 9, wherein the vulnerability examination schedule is determined corresponding to a vulnerability examination schedule received from an external administrating server.

11. The method according to claim 9, wherein the step of searching for potential vulnerabilities of the administrating web server is performed by searching for potential vulnerabilities that can allow abnormal access to the administrating web server, interrupt normal service of the administrating web server, or leak, modulate or delete data of the administrating web server.

12. The method according to claim 9, wherein the data included in the vulnerability search database comprises a list of vulnerabilities that can be searched by an external search engine.

13. An administrating web server including a web firewall for automatically checking for vulnerabilities in a web server, comprising:
- a processor;
- an administrating server scheduling part for ordering the examination of the administrating web server according to a predetermined examination schedule;
- a vulnerability search database calling part for calling a vulnerability search database previously stored according to the order of the administrating server scheduling part,
- wherein the called vulnerability search database comprises a list of vulnerabilities included in a web firewall from internet data transmitted thought the web firewall to the web server, and
- wherein the list of vulnerabilities are generated prior to using at least one external search engine to search for at least one or more of the vulnerabilities from the list of vulnerabilities;
- a vulnerability searching part for searching for potential vulnerabilities of the administrating web server corresponding to data included in the called vulnerability search database, wherein the vulnerability searching part searches for potential vulnerabilities of the administrating web server using at least one external search engine, and the vulnerability searching part searches for potential vulnerabilities by examining whether a network port prohibited to the administrating web server is open;
- a vulnerability information deducing part for optimizing the results searched in the vulnerability searching part to deduce vulnerability information;
- a vulnerability checking part for checking the vulnerabilities of the administrating web server based on the results deduced from the vulnerability information deducing part; and
- a detailed vulnerability information reporting part for reporting detailed information on the checked vulnerabilities.

* * * * *